(12) United States Patent
Xiang et al.

(10) Patent No.: US 12,248,797 B2
(45) Date of Patent: Mar. 11, 2025

(54) AGGREGATING BLOCK MAPPING METADATA TO IMPROVE LINKED CLONE READ PERFORMANCE

(71) Applicant: VMware LLC, Palo Alto, CA (US)

(72) Inventors: Enning Xiang, San Jose, CA (US); Wenguang Wang, Santa Clara, CA (US)

(73) Assignee: VMware LLC, Palo Alto, CA (US)

( * ) Notice: Subject to any disclaimer, the term of this patent is extended or adjusted under 35 U.S.C. 154(b) by 817 days.

(21) Appl. No.: 17/346,607

(22) Filed: Jun. 14, 2021

(65) Prior Publication Data

US 2022/0398115 A1 Dec. 15, 2022

(51) Int. Cl.
*G06F 9/455* (2018.01)
*G06F 16/11* (2019.01)
*G06F 16/22* (2019.01)

(52) U.S. Cl.
CPC ........ *G06F 9/45558* (2013.01); *G06F 16/113* (2019.01); *G06F 16/128* (2019.01); *G06F 16/2246* (2019.01); *G06F 2009/45562* (2013.01); *G06F 2009/45583* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 8,423,733 B1 * | 4/2013 | Ozdemir ................. | G06F 12/00 |
| 2011/0185253 A1 * | 7/2011 | Resch et al. ............ | G06F 11/08 |
| 2013/0263119 A1 * | 10/2013 | Pissay et al. ........... | G06F 9/455 |
| 2013/0290248 A1 * | 10/2013 | Fukatano et al. ....... | G06F 17/30 |

\* cited by examiner

*Primary Examiner* — James J Debrow
(74) *Attorney, Agent, or Firm* — King Intellectual Asset Management

(57) ABSTRACT

Linked clone read performance when retrieving data from a clone is improved at least by aggregating block mapping metadata efficiently. Primary metadata for a child clone maps a logical block address (LBA) for data in a data region of the child clone to a physical sector address (PSA) for data in the data region of the child clone. At least a portion of primary metadata for a parent clone of the child clone is copied into archival metadata for the child clone. In response to a read request, data is returned from the child clone, parent clone, or another ancestor of the child clone based on whether or not a read request LBA is within the primary metadata for the child clone, or within the archival metadata.

20 Claims, 13 Drawing Sheets

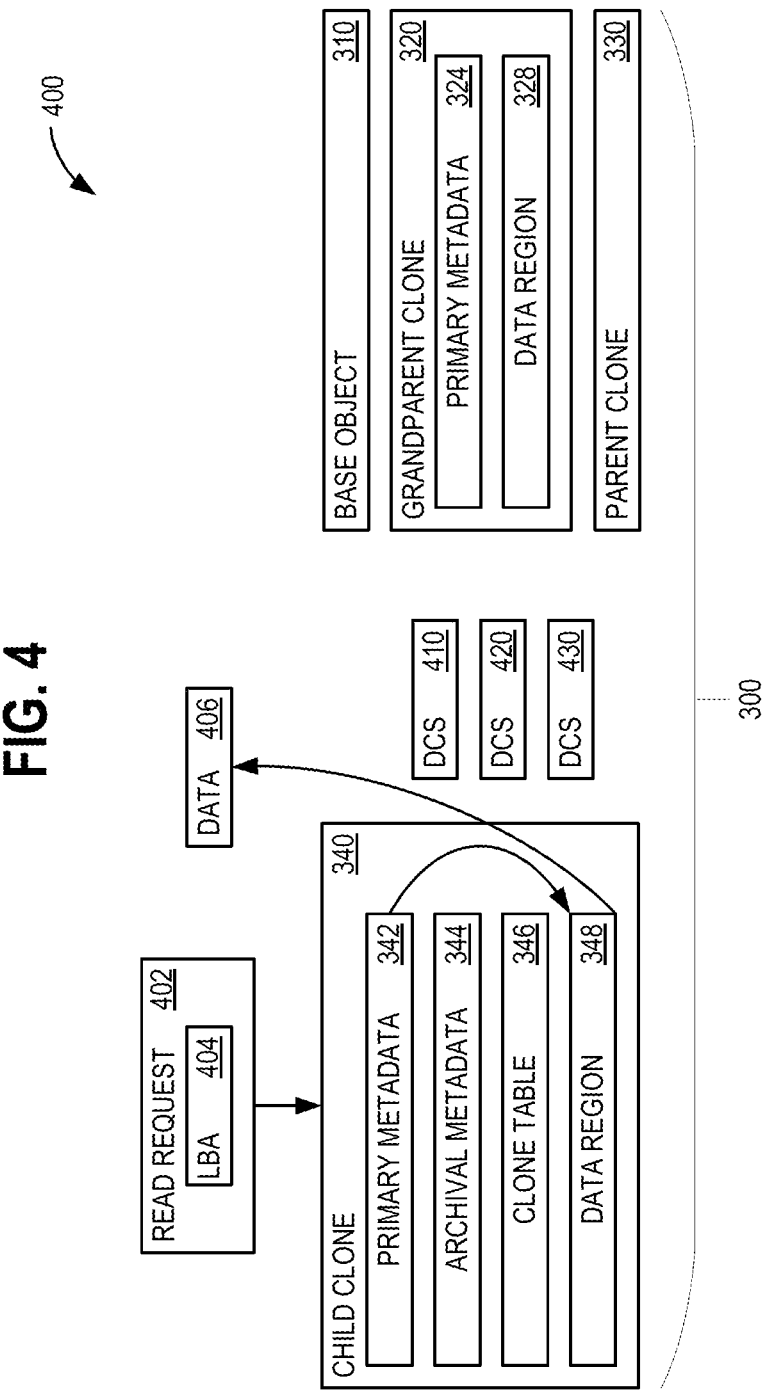

AGGREGATING BLOCK MAPPING METADATA TO IMPROVE LINKED CLONE READ PERFORMANCE

BACKGROUND

Virtualization leverages multiple objects for performance and reliability, including virtual machines (VMs) or other virtualized computing instances, snapshots, and clones. A VM functions in a virtual environment as a virtual computer system with its own processor, memory, network interface, and storage, while the virtual environment itself executes and is stored on a physical hardware system. A snapshot is a capture of the state of a VM at a given time, and may be used for error recovery (e.g., restoration of the VM after a crash or physical hardware system failure) or for other purposes. A clone is a copy of a VM that is able to execute on its own as a separate VM and has its own VM disk (VMDK) object and its own set of snapshots. Whereas clones are complete copies of a VM, snapshots may be limited to differences from a prior snapshot (e.g., capturing only what has changed for the VM since the prior snapshot—except for the first snapshot, which should be a complete copy). Clones may be created from base VMs or other clones (e.g., clone VMs), and may be created directly from a functioning VM or by assembling a complete set of snapshots for a VM.

Cloning a VM provides a convenient way to rapidly increase the number of VMs available to a user, because copying an existing VM as-is (e.g., cloning) precludes the need to configure an entirely new base VM. Clones may be either stand-alone or linked to form a clone tree. A stand-alone clone may have performance similar to the VM from which it was copied, whereas linked clones typically introduce a tradeoff, due to shared storage. That is, linked clones may incur a performance penalty in exchange for conserving storage space. One aspect of the potential performance degradation is that when a read request comes into a linked clone, if the logical block address (LBA) identified in the read request is not within the data region of that particular linked clone (which initially receives the read request), the data regions of other linked clones are searched until that LBA is located. In a worst-case scenario, all of the linked clones in a clone tree must be searched until the LBA is located in the final linked clone in the tree that is searched. With this arrangement, the performance penalty may grow linearly with the size of the clone tree (e.g., the number of linked clones). This linear penalty growth may result in an unfavorable user experience: either the number of available linked clones is limited or read performance may be slow.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure provide solutions for improving linked clone read performance when retrieving data from a clone that include: generating a child clone; generating primary metadata for the child clone, the primary metadata for the child clone comprising a logical block address (LBA) for data in a data region of the child clone and a physical sector address (PSA) for data in the data region of the child clone (and optionally a snapshot identifier of a local snapshot created at the clone), the primary metadata for the child clone mapping the LBA for data in the data region of the child clone to the PSA for data in the data region of the child clone; copying at least a portion of primary metadata for a parent clone of the child clone into archival metadata for the child clone, the archival metadata for the child clone comprising an LBA for data in a data region of the parent clone and a clone identifier (ID) identifying the parent clone; receiving a read request having a read request LBA; determining whether the read request LBA is within the primary metadata for the child clone; based on at least determining that the read request LBA is within the primary metadata for the child clone, returning data from the data region of the child clone; based on at least determining that the read request LBA is not within the primary metadata for the child clone, determining whether the read request LBA is within the archival metadata for the child clone; and based on at least determining that the read request LBA is within the archival metadata for the child clone, returning data from the data region of the parent clone or a data region of another ancestor of the child clone.

BRIEF DESCRIPTION OF THE DRAWINGS

The present description will be better understood from the following detailed description read in the light of the accompanying drawings, wherein:

FIG. 4 illustrates reading data from the clone tree of FIG. 3;

DETAILED DESCRIPTION

Figure 1:
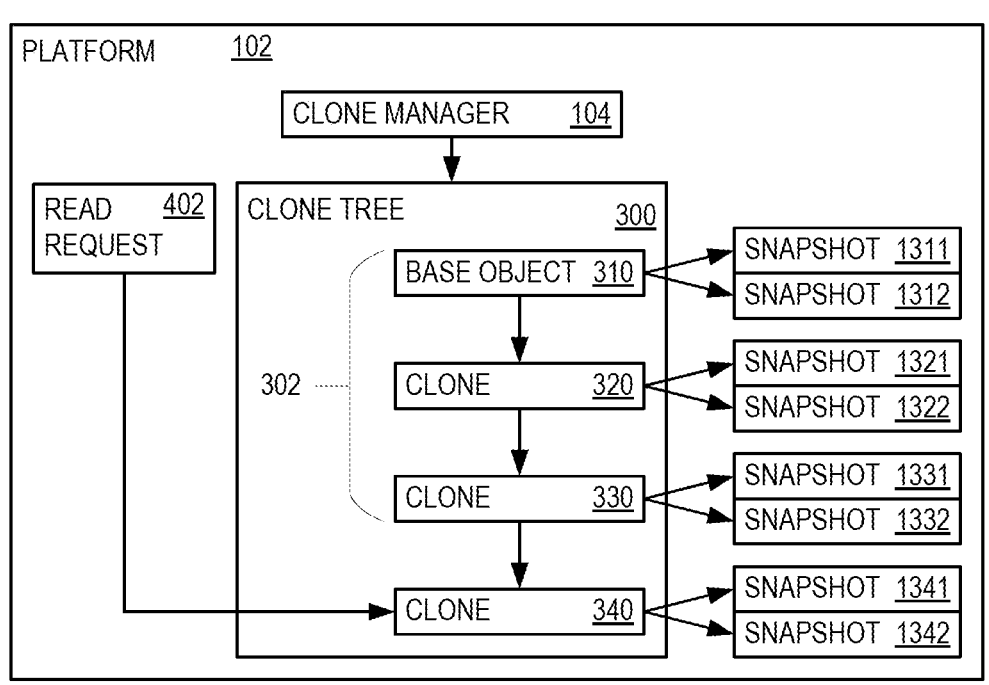
FIG. 1 illustrates an architecture that may advantageously improve linked clone read performance.

A recursive scheme is introduced that separates metadata for a linked clone into primary metadata storing logical block address (LBA) information for the current clone, and archival metadata storing LBA information for the entire set of ancestors. The ancestors include, for example, the immediate parent clone and other clones up through the original base object. When a new child clone is created, new primary metadata is created for the new child clone, and the extents of both the primary metadata and the archival metadata from the parent clone are copied into archival metadata for the new child clone. Some extents accessible to the clone might be in the primary metadata of the parent clone (e.g., those are newly written at the parent clone), and some extents accessible to the clone are in the archive metadata of the parent clone (e.g., those are written at one of the ancestor clones). The archival metadata format includes the LBA, number of blocks, source clone and source snapshot ID information.

Thus, archival metadata grows for each new child clone, automatically bringing in the history of the parent, which includes the duplicated history of its parent, which includes the history of its parent, etc. all the way back to the base object. Only a single copy source (the immediate parent) is needed for each generation, in order to maintain and grow the complete reference in the archival metadata.

This reference (or at least portions thereof) may remain sufficiently compact to be cached in live memory, precluding the time-consuming need to load each ancestor from slower storage and search the ancestors individually. At least by providing a complete reference for the full extent of LBAs that are anywhere within a clone tree (e.g., the latest child clone and its set of ancestors), which is searchable when a read request arrives at the child clone, the search for LBAs that are within one of the ancestors is faster, thereby improving linked clone read performance. Block mapping metadata is thus used in this manner to improve linked clone read performance.

Aspects of the disclosure provide solutions for improving linked clone read performance when retrieving data from a clone. A child clone is generated along with primary metadata for the child clone. The primary metadata for the child clone includes a LBA for data in a data region of the child clone and a physical sector address (PSA) for data in the data region of the child clone. The primary metadata for the child clone maps the LBA for data in the data region of the child clone to the PSA for data in the data region of the child clone. At least a portion of primary metadata for a parent clone of the child clone, and the extents accessible to the source snapshot of the parent clone, from which the child clone is forked, is copied into archival metadata for the child clone. The archival metadata for the child clone includes an LBA for data in a data region of the parent clone and a clone identifier (ID) identifying the parent clone. A read request having a read request LBA is received. A determination is made whether the read request LBA is within the primary metadata for the child clone. Based on at least determining that the read request LBA is within the primary metadata for the child clone, data is returned from the data region of the child clone. Based on at least determining that the read request LBA is not within the primary metadata for the child clone, a determination is made whether the read request LBA is within the archival metadata for the child clone. Based on at least determining that the read request LBA is within the archival metadata for the child clone, data is returned from the data region of the parent clone or a data region of another ancestor of the child clone.

Aspects of the disclosure improve the speed of computing operations at least by, based on at least determining that a read request LBA (e.g., an LBA indicated in a received read request) is not within the primary metadata for a child clone, determining whether the read request LBA is within the archival metadata for the child clone. This speed improvement in a read operation provides a practical, useful result, and further improves the functioning of the computer architecture and underlying computing device(s) involved. Aspects of the disclosure operate in an unconventional manner at least by copying at least a portion of primary metadata (and, in some examples, the extents accessible to the source snapshot of the parent clone, from which the child clone is forked) for a parent clone of the child clone into archival metadata for the child clone, the archival metadata for the child clone comprising an LBA for data in a data region of the parent clone and a clone ID identifying the parent clone. This unconventional operation improves the speed of read operations as described herein.

FIG. 1 illustrates an architecture 100 that may advantageously improve linked clone read performance by reducing read latency. In some examples, architecture 100 includes a computing platform 102 which may be implemented on one or more computing apparatus 818 of FIG. 8, and/or use a virtualization architecture 200 illustrated in FIG. 2. A clone tree 300 is generated by a clone manager 104 from a base object 310, and includes linked clones 320-340, and is illustrated in greater detail in FIGS. 3A-3E. With the set of three linked clones 320-340 illustrated, clone 340 will be identified as child clone 340, clone 330 will be identified as parent clone 330 because clone 330 is a parent to clone 340, and clone 320 will be identified as grandparent clone 320 because clone 320 is a parent to clone 330 (and thus a grandparent to clone 340). The terms parent and child are relative, for example, clone 330 is a child of clone 320. Together, base object 310 and clones 320 and 330 form a set of ancestors 302 for clone 340. As indicated, clone tree 300 receives an incoming read request 402 (e.g., an incoming read I/O), which is described in further detail in relation to FIGS. 4-5B.

Each of base object 310 and linked clones 320-340 has its own set of snapshots. For example, base object 310 has snapshot 1311 and snapshot 1312; clone 320 has snapshot 1321 and snapshot 1322; clone 330 has snapshot 1331 and snapshot 1332; and clone 340 has snapshot 1341 and snapshot 1342. Although only three clones with two snapshots each are illustrated, it should be understood that a different number of clones (e.g., thousands) and a different number of snapshots for each may be used. Aspects of the disclosure illustrate improved linked clone read performance for read request 402, as illustrated in FIGS. 4-7, which is enabled by the generation of clone tree 300 according to the scheme illustrated in FIGS. 3A-3E.

Figure 2:
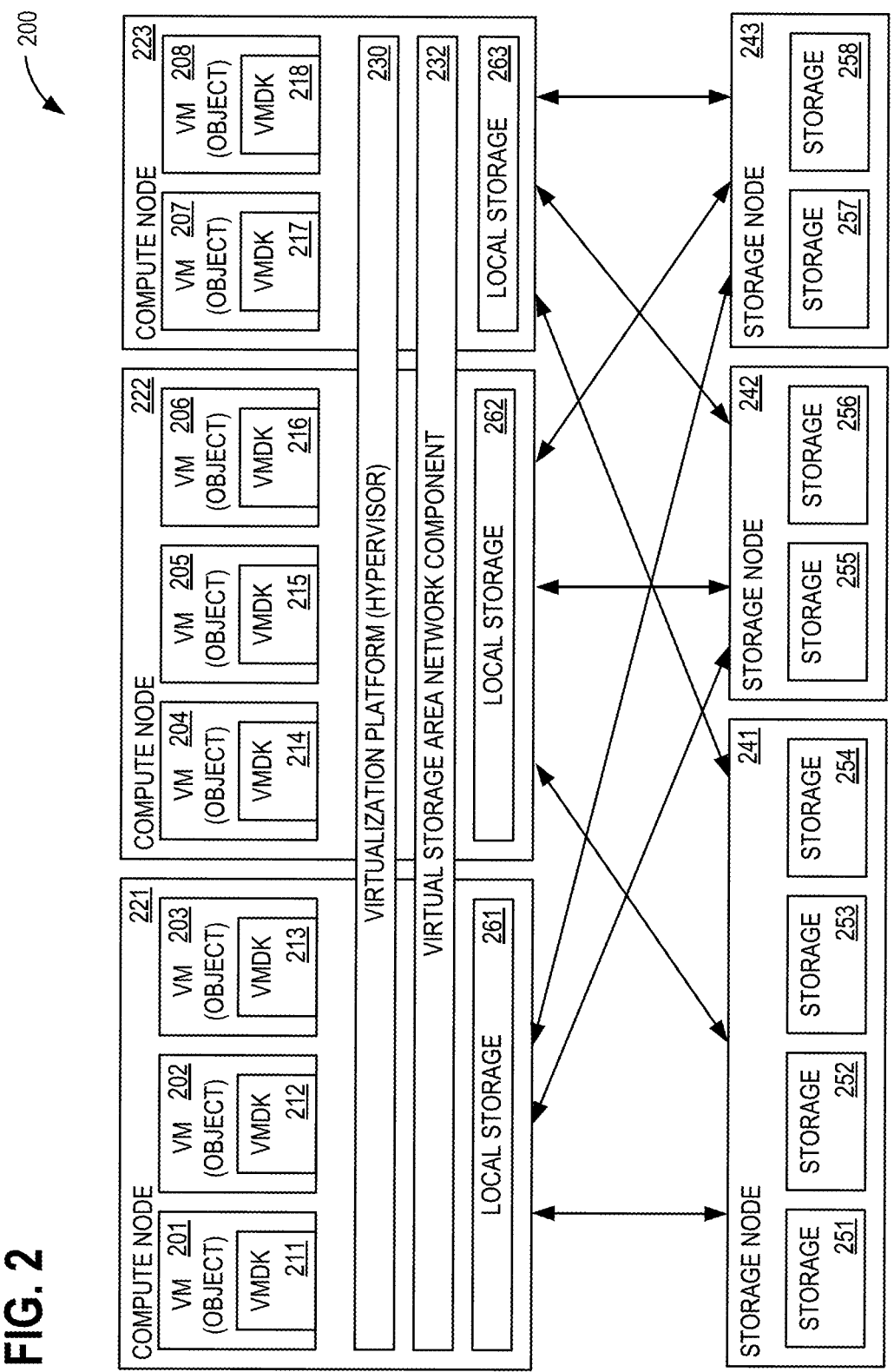
FIG. 2 illustrates further detail for some examples of the architecture of FIG. 1.

Examples of architecture 100 are operable with virtualized and non-virtualized storage solutions. FIG. 2 illustrates virtualization architecture 200 that may be used as a version of platform 102. Virtualization architecture 200 is comprised of a set of compute nodes 221-223, interconnected with each other and a set of storage nodes 241-243 according to an embodiment. In other examples, a different number of compute nodes and storage nodes may be used. Each compute node hosts multiple objects, which may be virtual machines (VMs, such as base objects, linked clones, and independent clones), containers, applications, or any compute entity (e.g., computing instance or virtualized computing instance) that consumes storage. When objects are created, they may be designated as global or local, and the designation is stored in an attribute. For example, compute node 221 hosts objects 201, 202, and 203; compute node 222 hosts objects 204, 205, and 206; and compute node 223 hosts objects 207 and 208. Some of objects 201-208 may be local objects. In some examples, a single compute node may host 50, 100, or a different number of objects. Each object uses a VM disk (VMDK), for example VMDKs 211-218 for each of objects 201-208, respectively. Other implementations using different formats are also possible. A virtualization platform 230, which includes hypervisor functionality at one or more of computer nodes 221, 222, and 223, manages objects 201-208. In some examples, various components of virtualization architecture 200, for example compute nodes 221, 222, and 223, and storage nodes 241, 242, and 243 are implemented using one or more computing apparatus such as computing apparatus 818 of FIG. 8.

Virtualization software that provides software-defined storage (SDS), by pooling storage nodes across a cluster, creates a distributed, shared data store, for example a storage area network (SAN). Thus, objects 201-208 may be virtual SAN (vSAN) objects. In some distributed arrangements, servers are distinguished as compute nodes (e.g., compute nodes 221, 222, and 223) and storage nodes (e.g., storage nodes 241, 242, and 243). Although a storage node may attach a large number of storage devices (e.g., flash, solid state drives (SSDs), non-volatile memory express (NVMe), Persistent Memory (PMEM), quad-level cell (QLC)) processing power may be limited beyond the ability to handle input/output (I/O) traffic. Storage nodes 241-243 each include multiple physical storage components, which may include flash, SSD, NVMe, PMEM, and QLC storage solutions. For example, storage node 241 has storage 251, 252, 252, and 254; storage node 242 has storage 255 and 256; and storage node 243 has storage 257 and 258. In some examples, a single storage node may include a different number of physical storage components.

In the described examples, storage nodes 241-243 are treated as a SAN with a single global object, enabling any of objects 201-208 to write to and read from any of storage 251-258 using a virtual SAN component 232. Virtual SAN component 232 executes in compute nodes 221-223. Using the disclosure, compute nodes 221-223 are able to operate with a wide range of storage options. In some examples, compute nodes 221-223 each include a manifestation of virtualization platform 230 and virtual SAN component 232. Virtualization platform 230 manages the generating, operations, and clean-up of objects 201 and 202. Virtual SAN component 232 permits objects 201 and 202 to write incoming data from object 201 and incoming data from object 202 to storage nodes 241, 242, and/or 243, in part, by virtualizing the physical storage components of the storage nodes.

Figure 3A:
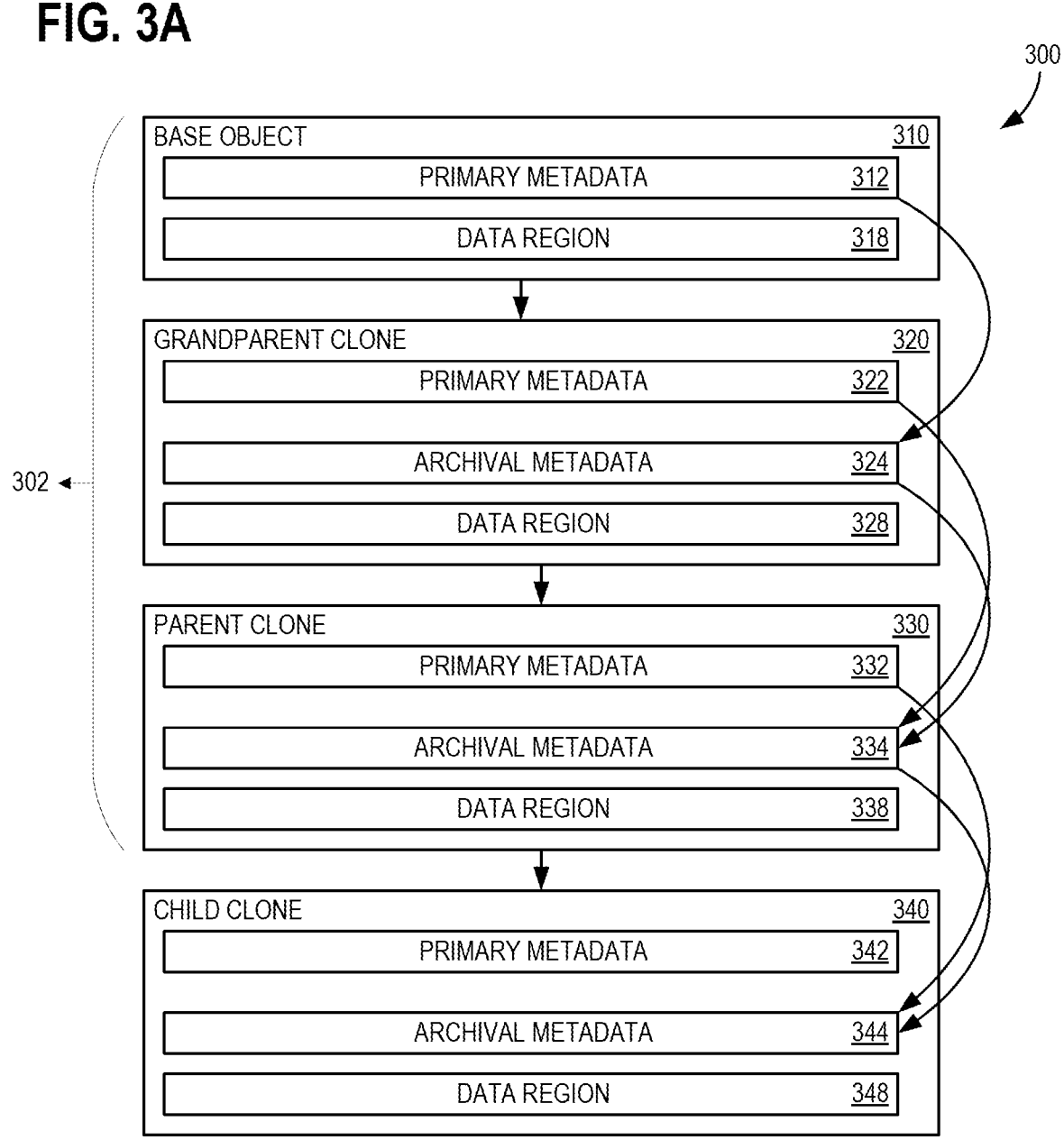
FIGS. 3A-3E illustrate recursive creation of archival metadata for logical block addresses (LBAs) for data held in a clone tree, as may occur with the architecture of FIG. 1.

FIGS. 3A-3E illustrates recursive creation of archival metadata for LBAs for data held in clone tree 300, as may occur with architecture 100. Referring to FIG. 3A, base object 310 has primary metadata 312 and a data region 318. Primary metadata 312 is illustrated in further detail in relation to FIG. 3B. Grandparent clone 320, which is cloned from base object 310, has its own primary metadata 322, archival metadata 324, and a data region 328. Archival metadata 324 of grandparent clone 320 is copied from primary metadata 312 of base object 310, although with some automated edits that are described in relation to FIG. 3C. That is, the extents accessible to the source snapshot of a parent clone, from which a child clone is forked, are copied into archival metadata for the child clone.

Parent clone 330, which is cloned from grandparent clone 320, has its own primary metadata 332, archival metadata 334, and a data region 338. Archival metadata 334 of parent clone 330 is copied from primary metadata 322 and archival metadata 324 of grandparent clone 320, although with some automated edits that are described in relation to FIG. 3D. Child clone 340, which is cloned from parent clone 330, has its own primary metadata 342, archival metadata 344, and a data region 348. Archival metadata 344 of child clone 340 is copied from primary metadata 342 and archival metadata 334 of parent clone 330, although with some automated edits that are described in relation to FIG. 3E. With this scheme, when a read request (e.g., read request 402, shown in FIG. 4) comes into child clone 340, a determination may be made whether the LBA in the read request is contained anywhere in clone tree 30, for example, within child clone 340 or set of ancestors 302) quickly, without the need to load any of set of ancestors 302 into memory from physical storage—although if the LBA is in one of set of ancestors 302, that object may need to be loaded into memory, in order to retrieve the contents of the LBA. However, the determination is made quickly, and the ancestor having the LBA is loaded without the need for a search of other ancestors.

Figure 3B:
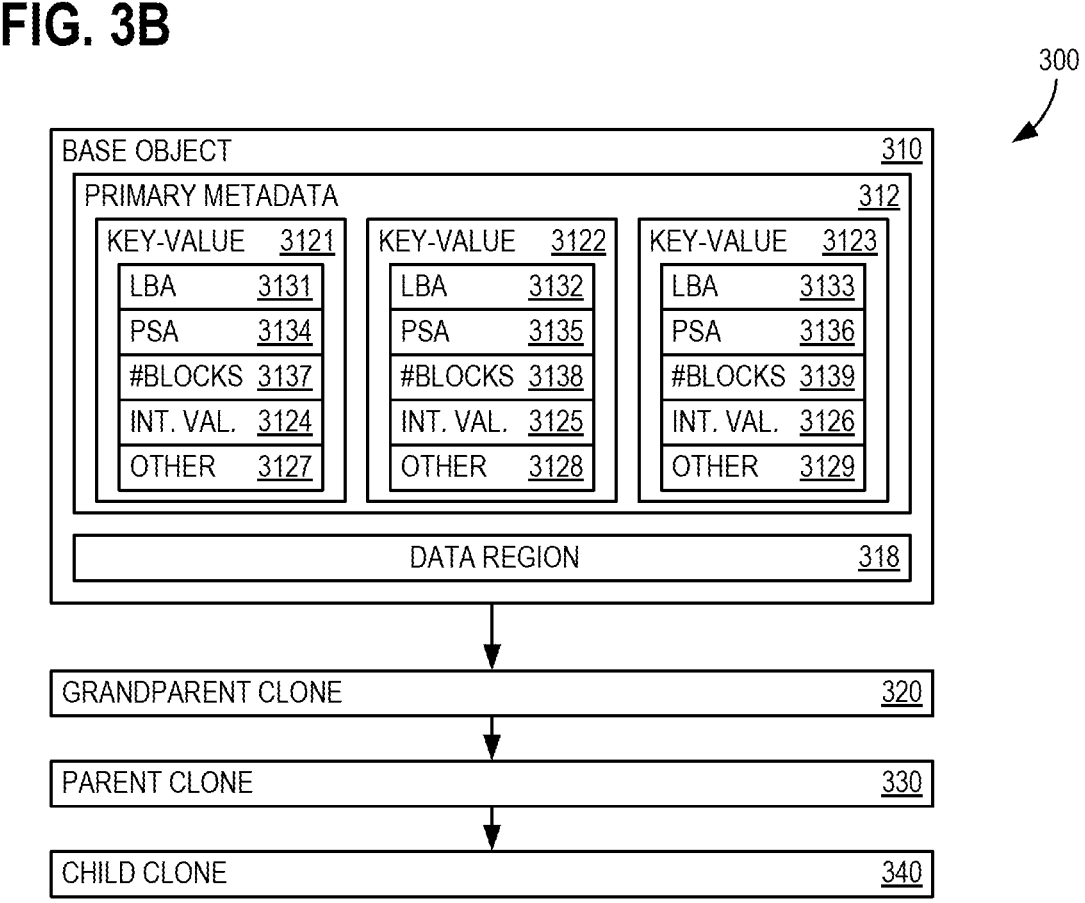

Referring now to FIG. 3B, further detail for base object 310 and primary metadata 312 is provided. Primary metadata 312 holds LBAs for data within data region 318 and is illustrated as comprising key-value pairs. In some examples, the keys comprise snapshot IDs of a snapshot, because a single clone may have multiple snapshots and the primary metadata covers metadata information of the extents of all snapshots. That is, a clone may be forked from a snapshot (as read-only), so a parent clone will at least have two snapshots internally, if it has a child clone. One snapshot is a read-only snapshot for the child clone, and the other(s) being writable snapshots for the running point of the parent clone.

In the illustrated example, a key-value pair 3121 has a key comprising an LBA 3131 and a snapshotID, that is mapped to a value having a PSA 3134 with an identified length as a number of blocks 3137. An integrity value 3124, such as a checksum or a cyclic redundancy check (CRC), may be used for error detection, and an other field 3127 may hold other data, such as a compression flag. A key-value pair 3122 has a key comprising an LBA 3132 and a snapshotID, that is mapped to a value having a PSA 3135 with an identified length as number of blocks 3138, an integrity value 3125, and an other field 3128. A key-value pair 3123 has a key comprising an LBA 3133 and a snapshotID, that is mapped to a value having a PSA 3136 with an identified length as number of blocks 3139, an integrity value 3126, and an other field 3129. Although three key-value pairs are illustrated, it should be understood that a different quantity may be used.

Figure 3C:
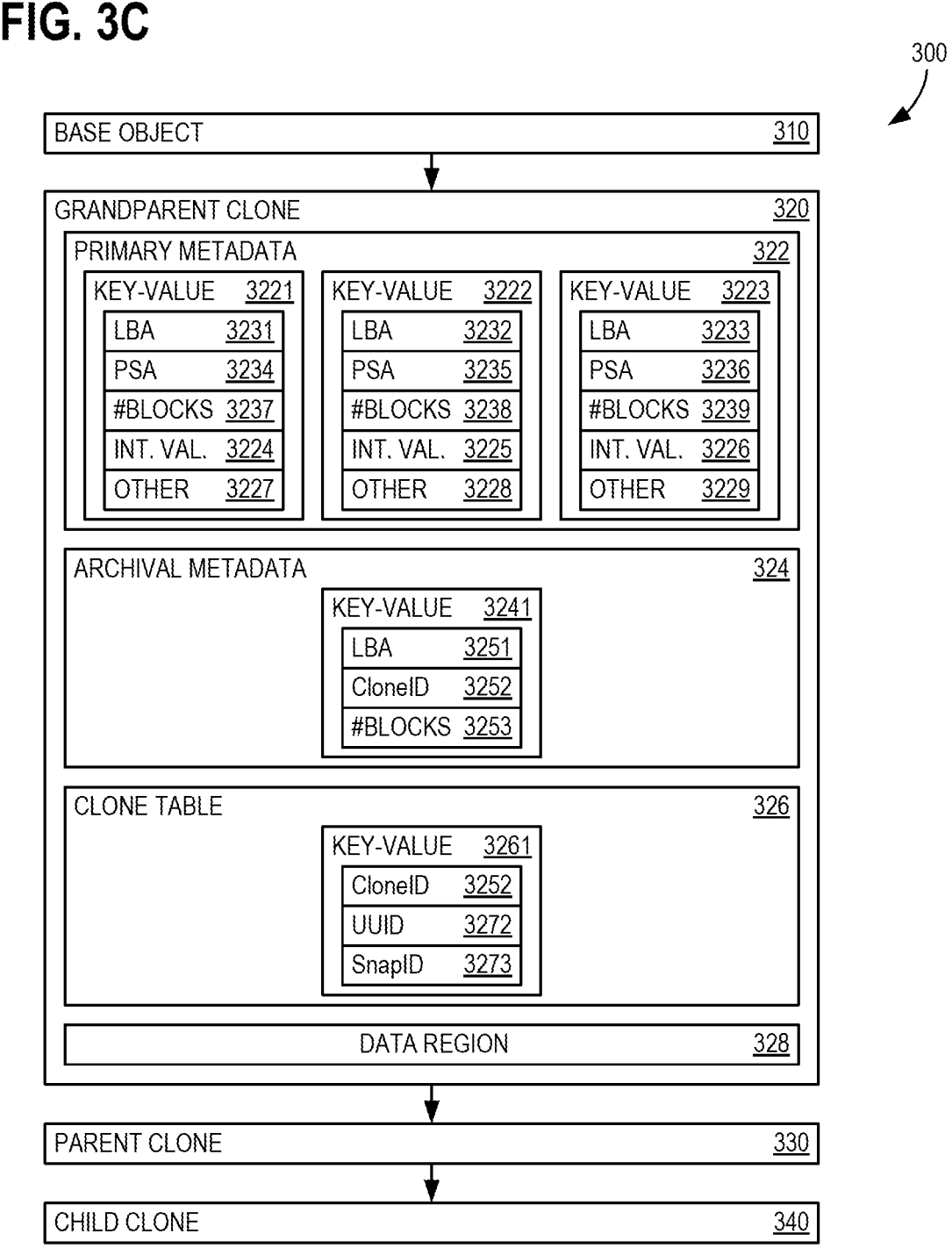

Referring now to FIG. 3C, further detail for grandparent clone 320, primary metadata 322, and archival metadata 324 is provided. Also, a clone table 326 is shown. In some examples, clone tables may be combined with archival metadata, although in some examples, clone tables are separate from archival metadata in order to keep archival metadata small enough that archival metadata and/or the clone table remains cached, providing for faster read access. Primary metadata 322 holds LBAs for data within data region 328 and is illustrated as comprising key-value pairs. A key-value pair 3221 has a key comprising an LBA 3231 and a snapshotID, that is mapped to a value having a PSA 3234 with an identified length as number of blocks 3237, an integrity value 3224, and an other field 3227. A key-value pair 3222 has a key comprising an LBA 3232 and a snapshotID, that is mapped to a value having a PSA 3235 with an identified length as number of blocks 3238, an integrity value 3225, and an other field 3228. A key-value pair 3223 has a key comprising an LBA 3233 and a snapshotID, that is mapped to a value having a PSA 3236 with an identified length as number of blocks 3239, an integrity value 3226, and an other field 3229. Although three key-value pairs are illustrated, it should be understood that a different quantity may be used. In some examples, the keys in the primary metadata of a clone further comprise the snapshot ID of a local snapshot created at the clone.

Archival metadata 324 is illustrated as comprising a key-value pair 3241 and is copied from primary metadata 312 of base object 310. Archival metadata 324, however, is illustrated as not being identical to primary metadata 312 (see FIG. 3B for more detail). For example, whereas LBAs 3131-3133 are identified separately for mapping to each of PSAs 3134-3136, key value pair 3241 has a key of a single LBA 3251 that spans the LBAs of base object 310. Key-value pair 3241 also has a cloneID 3252 identifying base object 310 (which may be 0000 for a base object), and an identified length as number of blocks 3253. The change from three LBA extents to a single LBA extent is an automatic edit that occurs when archival metadata 324 is generated. Clone table 326 has a key-value pair 3261 that uses cloneID 3252 as the key and maps it to a universally unique identifier (UUID) 3272 identifying base object 310, and also a snapshotID 3273.

Figure 3D:
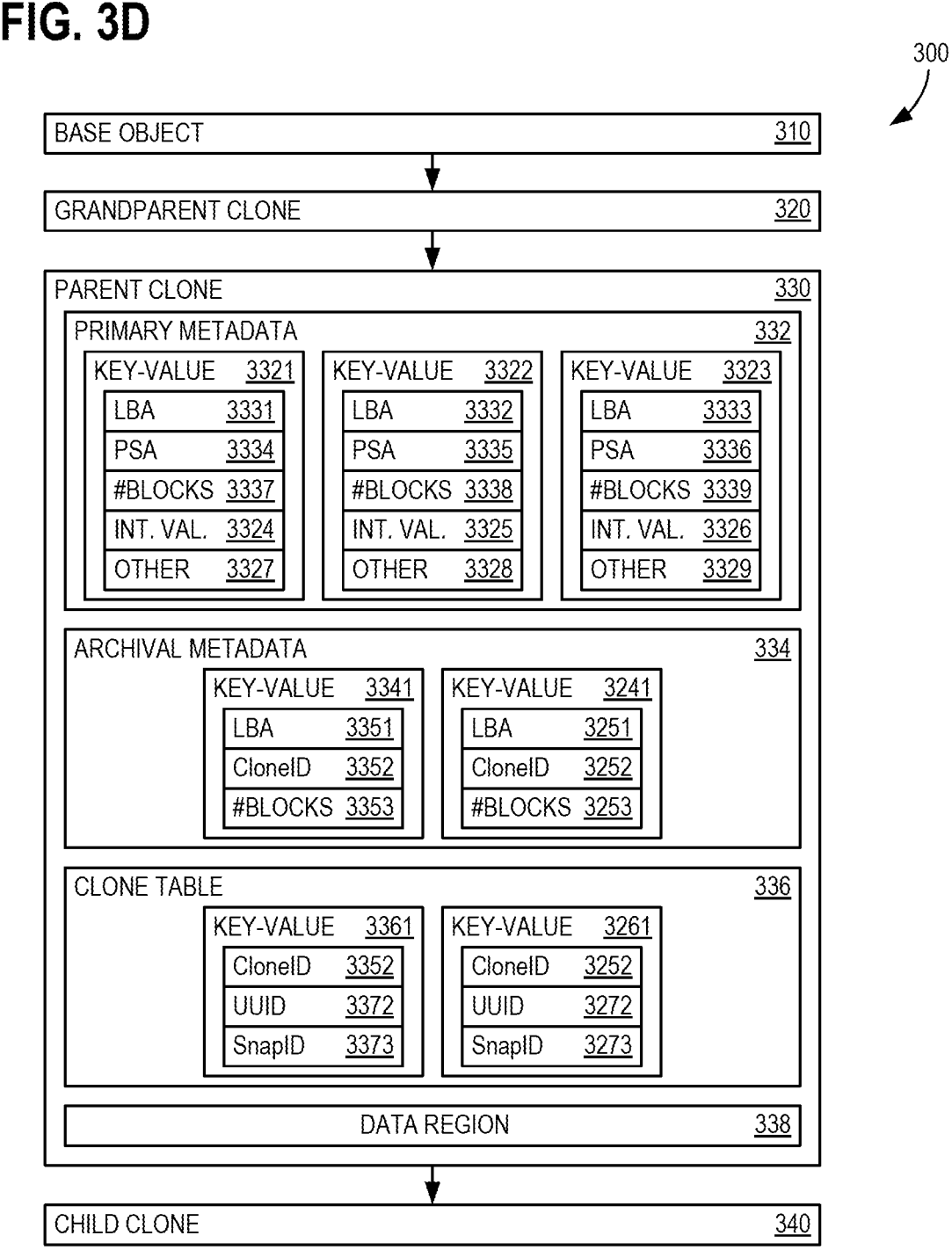

Referring now to FIG. 3D, further detail for parent clone 330, primary metadata 332, and archival metadata 334 is provided. Also, a clone table 336 is shown. Primary metadata 332 holds LBAs for data within data region 338 and is illustrated as comprising key-value pairs. A key-value pair 3321 has a key comprising an LBA 3331 and a snapshotID, that is mapped to a value having a PSA 3334 with an identified length as number of blocks 3337, an integrity value 3324, and an other field 3327. A key-value pair 3322 has a key comprising an LBA 3332 and a snapshotID, that is mapped to a value having a PSA 3335 with an identified length as number of blocks 3338, an integrity value 3325, and an other field 3328. A key-value pair 3323 has a key comprising an LBA 3333 and a snapshotID, that is mapped to a value having a PSA 3336 with an identified length as number of blocks 3339, an integrity value 3326, and an other field 3329. Although three key-value pairs are illustrated, it should be understood that a different quantity may be used.

Archival metadata 334 is illustrated as comprising key-value-value pair 3241 and a key-value pair 3341 and is copied from both archival metadata 324 and primary metadata 322 of grandparent clone 320. Key-value pair 3341 is illustrated as not being identical to primary metadata 322 (see FIG. 3C for more detail). For example, whereas LBAs 3231-3233 are identified separately for mapping to each of PSAs 3234-3236, key-value pair 3341 has a key of a single LBA 3351 that spans the LBAs of grandparent clone 320. Key-value pair 3341 also has a cloneID 3352 identifying grandparent clone 320 (which may be 0001 for the first clone of a base object), and an identified length as number of blocks 3353. The change from three LBAs to a single LBA is an automatic edit that occurs when archival metadata 334 is generated. Clone table 336 has key-value pair 3261 and a key-value pair 3361 that uses cloneID 3352 as the key and maps it to a UUID 3372 identifying grandparent clone 320, and also a snapshotID 3373.

Figure 3E:
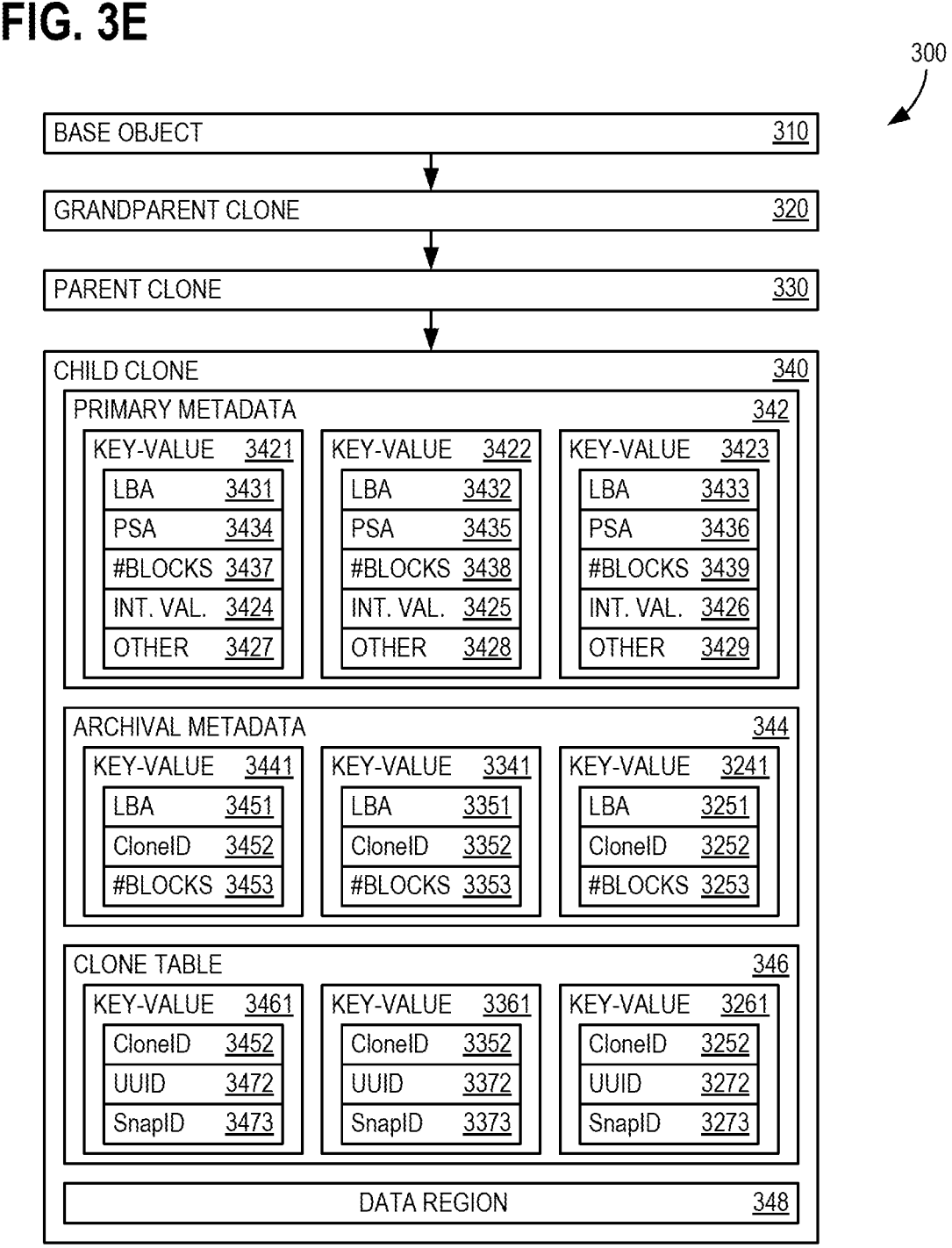

Referring now to FIG. 3E, further detail for child clone 340, primary metadata 342, and archival metadata 344 is provided. Also, a clone table 346 is shown. Primary metadata 342 holds LBAs for data within data region 348 and is illustrated as comprising key-value pairs. A key-value pair 3421 has a key comprising an LBA 3431 and a snapshotID, that is mapped to a value having a PSA 3434 with an identified length as number of blocks 3437, an integrity value 3424, and an other field 3427. A key-value pair 3422 has a key comprising an LBA 3432 and a snapshotID, that is mapped to a value having a PSA 3435 with an identified length as number of blocks 3438, an integrity value 3425, and an other field 3428. A key-value pair 3423 has a key comprising an LBA 3433 and a snapshotID, that is mapped to a value having a PSA 3436 with an identified length as number of blocks 3439, an integrity value 3426, and an other field 3429. Although three key-value pairs are illustrated, it should be understood that a different quantity may be used.

Archival metadata 344 is illustrated as comprising key-value-value pair 3241, key-value-value pair 3341, and a key-value pair 3441, and is copied from both archival metadata 334 and primary metadata 332 of parent clone 330. Key-value pair 3441 is illustrated as not being identical to primary metadata 332 (see FIG. 3D for more detail). For example, whereas LBAs 3331-3333 are identified separately for mapping to each of PSAs 3334-3336, key-value pair 3441 has a key of a single LBA 3451 that spans the LBAs of parent clone 330. Key-value pair 3441 also has a cloneID 3452 identifying parent clone 330, and an identified length as number of blocks 3453. The change from three LBAs to a single LBA is an automatic edit that occurs when archival metadata 34 is generated. Clone table 346 has key-value-value pair 3261, key-value-value pair 3361, and a key-value pair 3461 that uses cloneID 3452 as the key and maps it to a UUID 3472 identifying parent clone 330, and also a snapshotID 3473.

In operation, a received read request first goes to the latest child clone, in this example, child clone 340. An LBA in the read request is compared with LBAs 3434-3433 in primary metadata 342. If the LBA in the read request is not found in primary metadata 342, archival metadata 344 is searched. If the LBA in the read request is found in archival metadata 344, the corresponding cloneID is identified, and used to find the UUID of the object having the LBE in the read request in clone table 346. If the LBA in the read request is found in archival metadata 344, then the LBA in the read request is not in clone tree 300.

A two-generation example is provided. A base object has primary metadata with:

LBA_1: Snapshot_1 (of base object)->(mapped to) PSA=AAA (address), numBlocks=1;
LBA_1: Snapshot_2->PSA=BBB, numBlocks=1;
LBA_2: Snapshot_1->PSA=CCC, numBlocks=1;
LBA_2: Snapshot_3->PSA=DDD, numBlocks=1.

A child clone is forked from Snapshot_2 of the base object and has its own Snapshot_1. The child clone has primary metadata with:

LBA_1: Snapshot_1 (of child clone)->PSA=XXX, numBlocks=1;
LBA_3: Snapshot_1->PSA=YYY, numBlocks=1.

The child clone has archival metadata with:
LBA_1: Clone_ID (of base object), numBlocks=1;
LBA_2: Clone_ID, numBlocks=1.

The child clone has a clone table with:
Clone_ID->UUID=<UUID of base object>, snapshot_ID=Snapshot_2.

A read request comes into the child clone, requesting data from LBA_1. LBA_1 is found within the primary metadata of the child clone, and the data is read from PSA=XXX and returned to the requesting client. Another read request comes into the child clone, requesting data from LBA_2. LBA_2 is not found within the primary metadata of the child clone, however, the archival metadata indicates it may be found in Clone_ID. The UUID corresponding to Clone_ID is retrieved from the clone table. A read request is issued to the base object for LBA_2, and the data is retrieved from PSA=CCC and returned to the requesting client.

This example illustrates the reduction in the key size from the primary metadata (LBA plus the snapshotID) to just the duplicated LBA in the archival metadata. Although, in some examples, this reduces the size of the key from 8 bytes to 4 bytes, when there are thousands of keys, the size difference may be sufficient to keep the smaller size cached in memory. Additionally, the value portion of the key-value pair is reduced from potentially several values, including an integrity value and a compression flag, to only two values (clone_ID and the number of blocks).

Returning to the example of clone tree 300, shown in FIGS. 3A-3E, FIG. 4 illustrates reading data from clone tree 300, specifically reading data that is local to child clone 340. In a scenario 400, child clone 340 receives read request 402, which has a read request LBA 404. That is, read request 402 seeks data located at read request LBA 404. For scenario 400, read request LBA 404 may match LBA 3431. Primary metadata 342 is searched for read request LBA 404, which is located within primary metadata 342. Because read request LBA 404 is found within primary metadata 342, the data at read request LBA 404 is read from data region 348 (using PSA 3434) and returned as data 406 from data region 348 of child clone 340. FIG. 4 further illustrates a distributed object manager (DOM) client session DCS) linking child clone 340 to each of base object 310 (linked by a DCS 410), grandparent clone 320 (linked by a DCS 420), and parent clone 330 (linked by a DCS 430). However, because data 406 was local to child clone 340, none of DCSs 410-430 are needed in order to retrieve data 406.

Figure 5A:
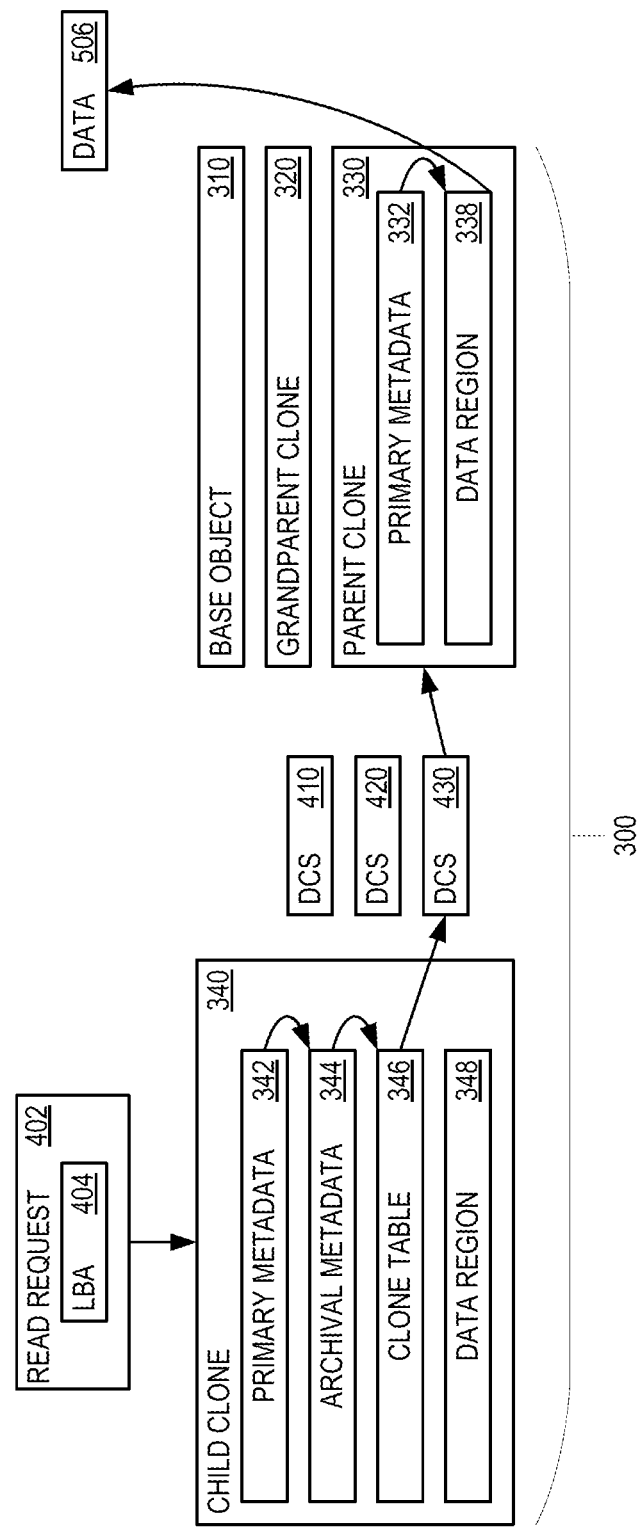
FIGS. 5A and 5B illustrate advantageous use of the archival metadata of FIG. 3 for improving linked clone read performance.

FIG. 5A illustrates advantageous use of archival metadata 344 for improving linked clone read performance. In a scenario 500a, child clone 340 receives read request 402, which has read request LBA 404. For scenario 500a, read request LBA 404 may match LBA 3331. Primary metadata 342 is searched for read request LBA 404, but is not found. Archival metadata 344 is searched for read request LBA 404. Because LBA 3451 spans the extent of parent clone 330, and is located within archival metadata 344, cloneID 3452 is identified that indicates parent clone 330. Clone table 346 maps cloneID 3452 to UUID 3472, enabling DCS 430 to forward read request 402 to parent clone 330. Within parent clone 330, primary metadata 332 identifies read request LBA 404 as matching LBA 3331 at PSA 3334. The data at read request LBA 404 is read from data region 338 and returned as data 506 from data region 338 of parent clone 330.

Figure 5B:
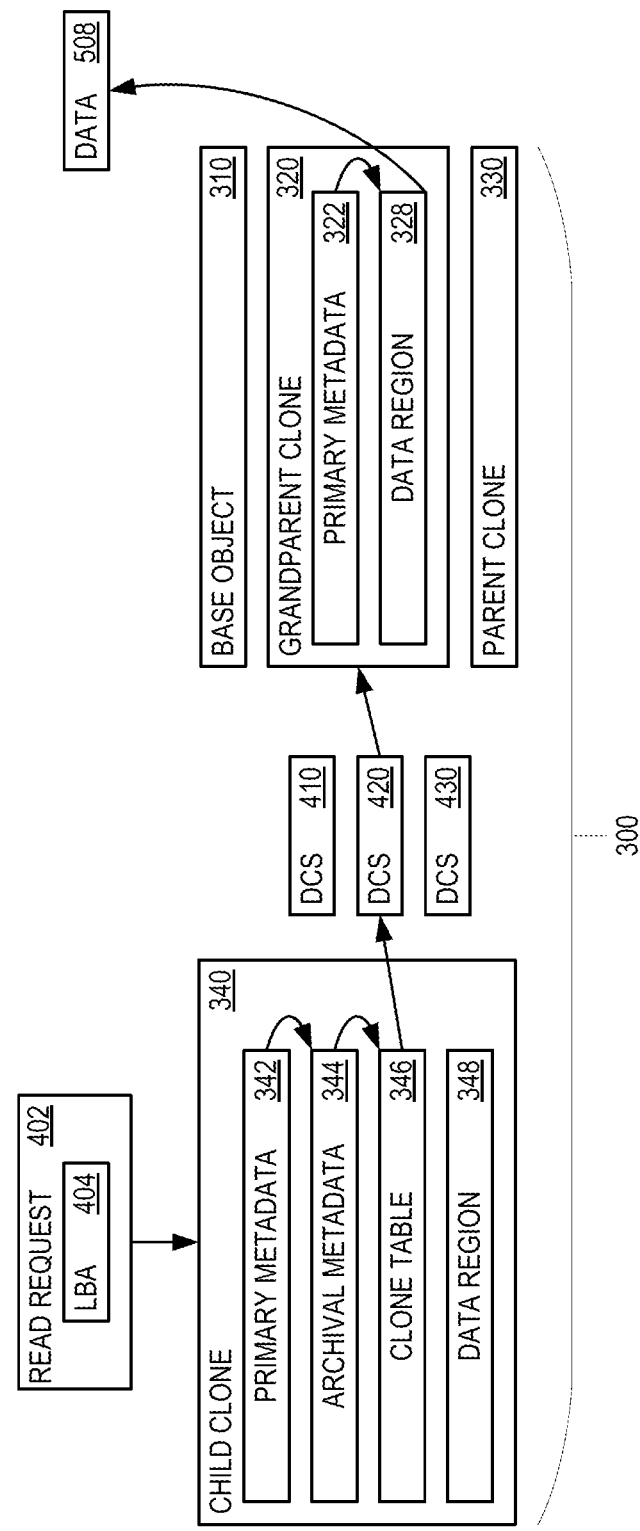

FIG. 5B illustrates an advantageous use of archival metadata 344 for improving linked clone read performance in another scenario. In scenario 500b, child clone 340 receives read request 402, which has read request LBA 404. For scenario 500b, read request LBA 404 may match LBA 3231. Primary metadata 342 is searched for read request LBA 404, but is not found. Archival metadata 344 is searched for read request LBA 404. Because LBA 3351 spans the extent of grandparent clone 320, and is located within archival metadata 344, cloneID 3352 is identified that indicates grandparent clone 320. Clone table 346 maps cloneID 3352 to UUID 3372, enabling DCS 420 to forward read request 402 to grandparent clone 320. Within grandparent clone 320, primary metadata 322 identifies read request LBA 404 as matching LBA 3231 at PSA 3234. The data at read request LBA 404 is read from data region 328 and returned as data 508 from data region 328 of grandparent clone 320.

Figure 6:
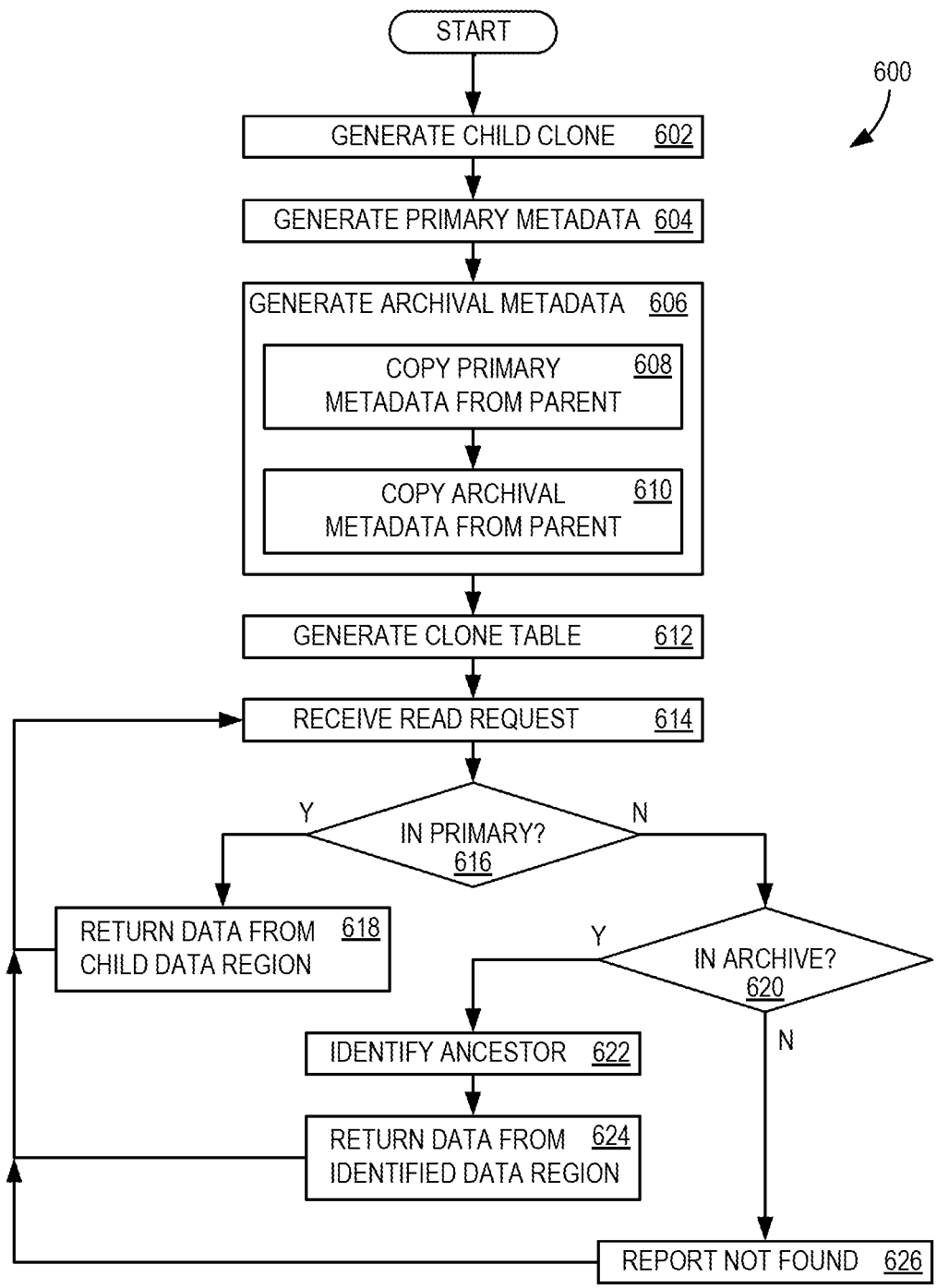
FIG. 6 illustrates a flowchart of exemplary operations associated with the architecture of FIG. 1.

FIG. 6 illustrates a flowchart 600 of exemplary operations associated with improving linked clone read performance. In some examples, the operations of flowchart 600 are performed by one or more computing apparatus 818 of FIG. 8. Flowchart 600 commences with operation 602, which includes generating child clone 340 and creating data region 348 in child clone 340. In some examples, operation 602 further incudes generating a virtual storage area network object (vSAN) object for child clone 340.

Operation 604 includes generating primary metadata 342 for child clone 340, primary metadata 342 for child clone 340 comprising an LBA for data in data region 348 of child clone 340 and a PSA for data in data region 348 of child clone 340, primary metadata 342 for child clone 340 mapping the LBA for data in data region 348 of child clone 340 to the PSA for data in data region 348 of child clone 340. In some examples, primary metadata 342 for child clone 340 further comprises a number of blocks for the LBA for data in data region 348 of child clone 340. In some examples, primary metadata 342 for child clone 340 comprises a B+tree. However, aspects of the disclosure are operable with any sequential data structure (e.g., a linear data structure such as an array). In some examples, primary metadata 342 for child clone 340 comprises a key-value pair. In some examples, the key of primary metadata 342 comprises the LBA for data in data region 348 of child clone 340. In some examples, the key of primary metadata 342 further comprises a snapshot ID for data in data region 348 of child clone 340. In some examples, the value corresponding to the key of primary metadata 342 comprises the PSA for data in data region 348 of child clone 340, the number of blocks for the LBA, an integrity value, a compression flag, and/or checksum. In some examples, the integrity value comprises a CRC.

Operation 606 generates archival metadata 344 and is performed by operations 608 and 610. Operation 608 includes copying at least a portion (not necessarily all) of primary metadata 332 for parent clone 330 of child clone 340 into archival metadata 344 for child clone 340, archival metadata 344 for child clone 340 comprising an LBA for data in data region 338 of parent clone 330 and a clone ID identifying parent clone 330. That is, the extents accessible to the source snapshot of parent clone 330, from which child clone 340 is forked, is copied into archival metadata 344 for child clone 340. In some scenarios, if the source snapshot at parent clone 330 does not have an additional new write, the extents that need to be copied may just come from the archival metadata 334 of parent clone 330.

Operation 610 includes copying archival metadata 334 for parent clone 330 into archival metadata 344 for child clone 340, thereby creating a complete reference for set of ancestors 302 of child clone 340. Set of ancestors 302 of child clone 340 comprises parent clone 330 of child clone 340. In some examples, archival metadata 344 for child clone 340 is read-only. In some examples, archival metadata 344 for child clone 340 further comprises a number of blocks for the LBA for data in data region 338 of parent clone 330. In some examples, archival metadata 344 for child clone 340 comprises a B+tree. In some examples, archival metadata 344 for child clone 340 comprises a key-value pair (or a list or a group of pairs, each representing an extent in the archival metadata). In some examples, the key of archival metadata 344 comprises the LBA for data in data region 338 of parent clone 330. In some examples, the value corresponding to the key of archival metadata 344 comprises the clone ID identifying parent clone 330. In some examples, the value corresponding to the key of archival metadata 344 further comprises the number of blocks for the LBA for data in data region 338 of parent clone 330.

Operation 612 includes generating clone table 346 for child clone 340. In some examples, clone table 346 for child clone 340 comprises the clone ID identifying parent clone 330, a universally unique identifier (UUID) of parent clone 330, and a snapshot ID. In some examples, archival metadata 344 for child clone 340 and clone table 346 for child clone 340 are combined into a single data structure.

Operation 614 includes receiving read request 402 having read request LBA 404, and decision operation 616 includes determining whether read request LBA 404 is within primary metadata 342 for child clone 340. If so, operation 618 includes, based on at least determining that read request LBA 404 is within primary metadata 342 for child clone 340, returning data 406 from data region 348 of child clone 340. Flowchart 600 then returns to operation 614 to wait for another read request.

Otherwise, based on at least determining that read request LBA 404 is not within primary metadata 342 for child clone 340, decision operation 620 determines whether read request LBA 404 is within archival metadata 344 for child clone 340. If so, operation 622 includes, based on at least determining that read request LBA 404 is within archival metadata 344 for child clone 340, determining whether read request LBA 404 is within data region 338 of parent clone 330 or within a data region of another other ancestor of child clone 340 (e.g., within data region 328 of grandparent clone 320). In some examples, determining whether read request LBA 404 is within data region 338 of parent clone 330 or within the data region of the other ancestor of child clone 340 comprises determining whether archival metadata 344 for child clone 340 associates read request LBA 404 with parent clone 330 or with the other ancestor of child clone 340.

Operation 624 includes, based on at least determining that read request LBA 404 is within archival metadata 344 for child clone 340, returning data from data region 338 of parent clone 330 or the data region of the ancestor of child clone 340. This may be similar to operations 614-618 in some examples, although for the parent clone or other ancestor. Flowchart 600 then returns to operation 614 to wait for another read request.

However, if read request LBA 404 is not found within child clone 340, operation 626 includes, based on at least determining that read request LBA 404 is not within primary metadata 342 for child clone 340 or within archival metadata 344 for child clone 340, returning an indication of read request LBA 404 not being found in either child clone 340 or set of ancestors 302 of child clone 340. Flowchart 600 then returns to operation 614 to wait for another read request.

Figure 7:
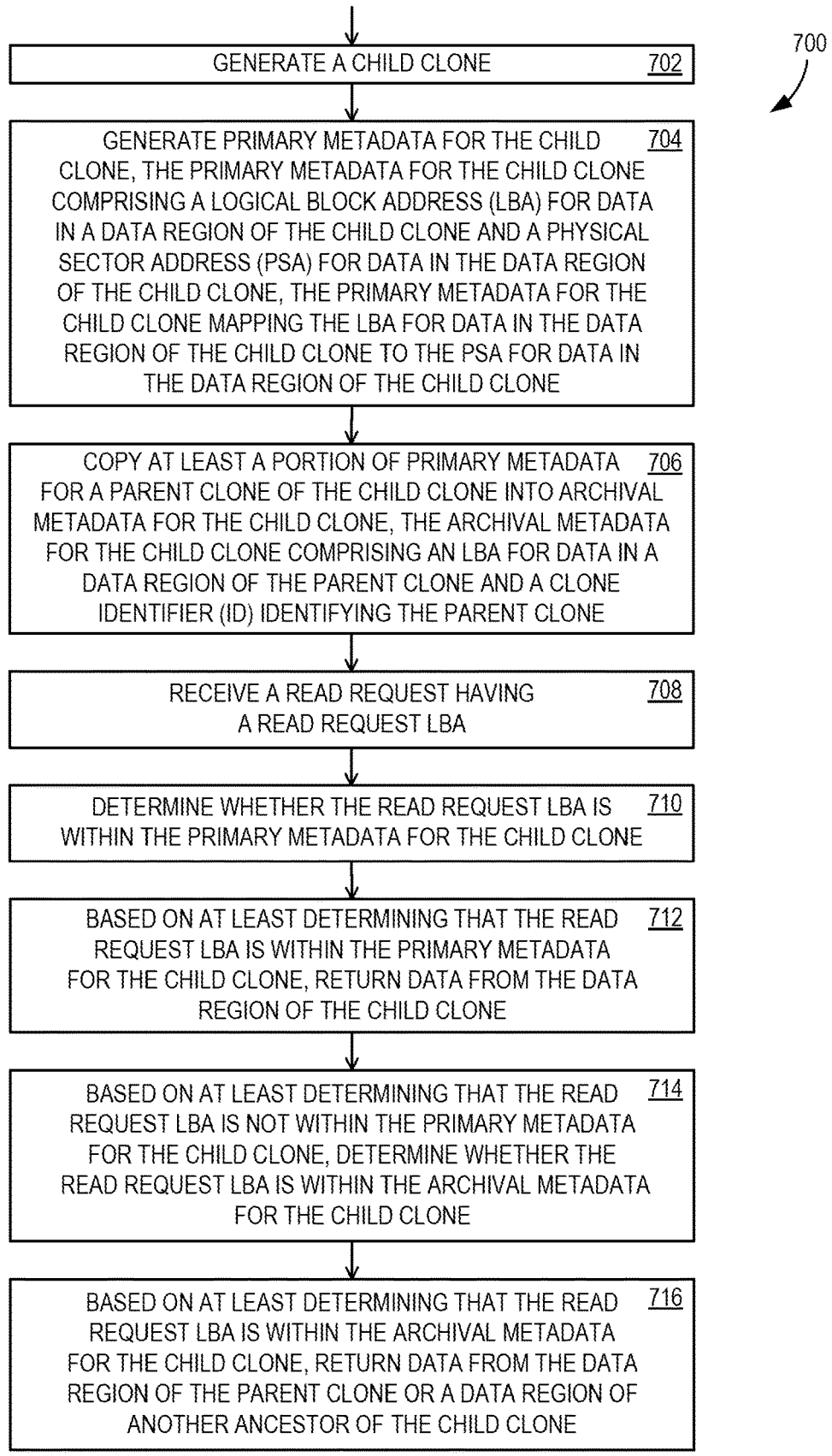
FIG. 7 illustrates another flowchart of exemplary operations associated with the architecture of FIG. 1.

FIG. 7 illustrates a flowchart 700 of exemplary operations associated with improving linked clone read performance. In some examples, the operations of flowchart 600 are performed by one or more computing apparatus 818 of FIG. 8. Flowchart 700 commences with operation 702, which includes generating a child clone. Operation 704 includes generating primary metadata for the child clone, the primary metadata for the child clone comprising an LBA for data in a data region of the child clone and a PSA for data in the data region of the child clone, the primary metadata for the child clone mapping the LBA for data in the data region of the child clone to the PSA for data in the data region of the child clone.

Operation 706 includes copying at least a portion of primary metadata for a parent clone of the child clone into archival metadata for the child clone, the archival metadata for the child clone comprising an LBA for data in a data region of the parent clone and a clone ID identifying the parent clone. Operation 708 includes receiving a read request having a read request LBA. Operation 710 includes determining whether the read request LBA is within the primary metadata for the child clone. Operation 712 includes, based on at least determining that the read request LBA is within the primary metadata for the child clone, returning data from the data region of the child clone.

Operation 714 includes, based on at least determining that the read request LBA is not within the primary metadata for the child clone, determining whether the read request LBA is within the archival metadata for the child clone. Operation 716 includes, based on at least determining that the read request LBA is within the archival metadata for the child clone, returning data from the data region of the parent clone or a data region of another ancestor of the child clone.

Additional Examples

An example method of retrieving data from a clone comprises: generating a child clone; generating primary metadata for the child clone, the primary metadata for the child clone comprising a logical block address (LBA) for data in a data region of the child clone and a physical sector address (PSA) for data in the data region of the child clone, the primary metadata for the child clone mapping the LBA for data in the data region of the child clone to the PSA for data in the data region of the child clone; copying at least a portion of primary metadata for a parent clone of the child clone into archival metadata for the child clone, the archival metadata for the child clone comprising an LBA for data in a data region of the parent clone and a clone ID identifying the parent clone; receiving a read request having a read request LBA; determining whether the read request LBA is within the primary metadata for the child clone; based on at least determining that the read request LBA is within the primary metadata for the child clone, returning data from the data region of the child clone; based on at least determining that the read request LBA is not within the primary metadata for the child clone, determining whether the read request LBA is within the archival metadata for the child clone; and based on at least determining that the read request LBA is within the archival metadata for the child clone, returning data from the data region of the parent clone or a data region of another ancestor of the child clone.

An example computer system comprises: a processor; and a non-transitory computer readable medium having stored thereon program code executable by the processor, the program code causing the processor to: generate a child clone; generate primary metadata for the child clone, the primary metadata for the child clone comprising an LBA for data in a data region of the child clone and a PSA for data in the data region of the child clone, the primary metadata for the child clone mapping the LBA for data in the data region of the child clone to the PSA for data in the data region of the child clone; copy at least a portion of primary metadata for a parent clone of the child clone into archival metadata for the child clone, the archival metadata for the child clone comprising an LBA for data in a data region of the parent clone and a clone ID identifying the parent clone; receive a read request having a read request LBA; determine whether the read request LBA is within the primary metadata for the child clone; based on at least determining that the read request LBA is within the primary metadata for the child clone, return data from the data region of the child clone; based on at least determining that the read request LBA is not within the primary metadata for the child clone, determine whether the read request LBA is within the archival metadata for the child clone; and based on at least determining that the read request LBA is within the archival metadata for the child clone, return data from the data region of the parent clone or a data region of another ancestor of the child clone.

An example non-transitory computer storage medium has stored thereon program code executable by a processor, the program code embodying a method comprising: generating a child clone; generating primary metadata for the child clone, the primary metadata for the child clone comprising an LBA for data in a data region of the child clone and a PSA for data in the data region of the child clone, the primary metadata for the child clone mapping the LBA for data in the data region of the child clone to the PSA for data in the data region of the child clone; copying at least a portion of primary metadata for a parent clone of the child clone into archival metadata for the child clone, the archival metadata for the child clone comprising an LBA for data in a data region of the parent clone and a clone ID identifying the parent clone; receiving a read request having a read request LBA; determining whether the read request LBA is within the primary metadata for the child clone; based on at least determining that the read request LBA is within the primary metadata for the child clone, returning data from the data region of the child clone; based on at least determining that the read request LBA is not within the primary metadata for the child clone, determining whether the read request LBA is within the archival metadata for the child clone; and based on at least determining that the read request LBA is within the archival metadata for the child clone, returning data from the data region of the parent clone or a data region of another ancestor of the child clone.

Alternatively, or in addition to the other examples described herein, examples include any combination of the following:

- copying archival metadata for the parent clone into the archival metadata for the child clone, thereby creating a complete reference for a set of ancestors of the child clone;
- the set of ancestors of the child clone comprises the parent clone of the child clone;
- based on at least determining that the read request LBA is within the archival metadata for the child clone, determining whether the read request LBA is within the data region of the parent clone or within the data region of the other ancestor of the child clone;
- based on at least determining that the read request LBA is not within the primary metadata for the child clone or within the archival metadata for the child clone, returning an indication of the read request LBA not being found in either the child clone or the set of ancestors of the child clone;
- generating a clone table for the child clone;
- the clone table for the child clone comprises the clone ID identifying the parent clone, a UUID of the parent clone, and a snapshot ID;
- the primary metadata for the child clone further comprises a number of blocks for the LBA for data in a data region of the child clone;
- the archival metadata for the child clone further comprises a number of blocks for the LBA for data in a data region of the parent clone;
- the primary metadata for the child clone comprises a B+tree;
- the archival metadata for the child clone is read-only;
- generating a vSAN object for the child clone;
- the primary metadata for the child clone comprises a key-value pair;
- the key of the primary metadata comprises the LBA for data in the data region of the child clone;
- the key of the primary metadata further comprises a snapshot ID for data in the data region of the child clone;
- the value corresponding to the key of the primary metadata comprises the PSA for data in the data region of the child clone;
- the value corresponding to the key of the primary metadata further comprises the number of blocks for the LBA for data in the data region of the child clone;
- the value corresponding to the key of the primary metadata further comprises an integrity value;
- the integrity value comprises a checksum;
- the integrity value comprises a CRC;
- the value corresponding to the key of the primary metadata further comprises a compression flag;
- the archival metadata for the child clone comprises a B+tree;
- the archival metadata for the child clone comprises a key-value pair;
- the key of the archival metadata data for the child clone comprises the LBA for data in the data region of the parent clone;
- the value corresponding to the key of the archival metadata comprises the clone ID;
- the value corresponding to the key of the archival metadata further comprises the number of blocks for the LBA for data in the data region of the parent clone;
- determining whether the read request LBA is within the data region of the parent clone or within the data region of the other ancestor of the child clone comprises determining whether the archival metadata for the child clone associates the read request LBA with the parent clone or with the other ancestor of the child clone.
- the archival metadata for the child clone and the clone table for the child clone are combined into a single data structure.

Exemplary Operating Environment

Figure 8:
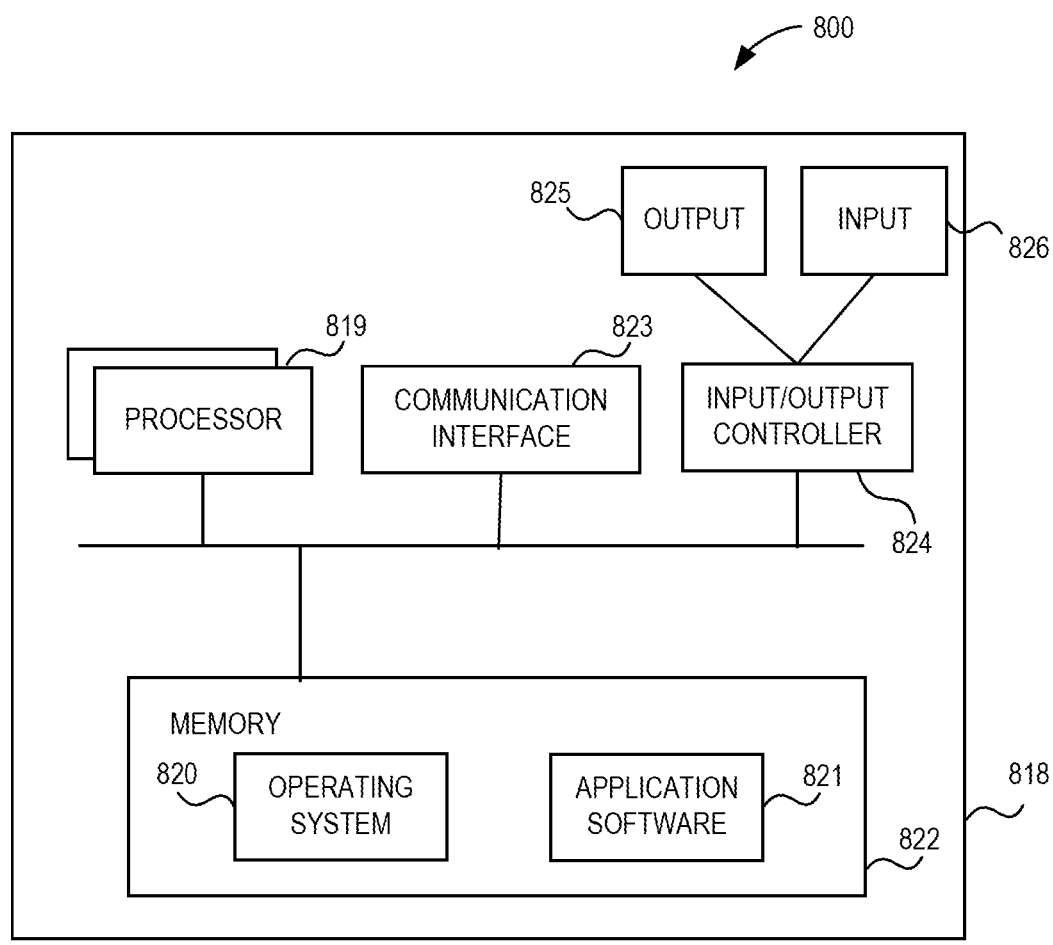
FIG. 8 illustrates a block diagram of a computing apparatus that may be used as a component of the architecture of FIG. 1, according to an example.

The present disclosure is operable with a computing device (computing apparatus) according to an embodiment shown as a functional block diagram 800 in FIG. 8. In an embodiment, components of a computing apparatus 818 may be implemented as a part of an electronic device according to one or more embodiments described in this specification. The computing apparatus 818 comprises one or more processors 819 which may be microprocessors, controllers, or any other suitable type of processors for processing computer executable instructions to control the operation of the electronic device. Alternatively, or in addition, the processor 819 is any technology capable of executing logic or instructions, such as a hardcoded machine. Platform software comprising an operating system 820 or any other suitable platform software may be provided on the computing apparatus 818 to enable application software 821 to be executed on the device. According to an embodiment, the operations described herein may be accomplished by software, hardware, and/or firmware.

Computer executable instructions may be provided using any computer-readable medium (e.g., any non-transitory computer storage medium) or media that are accessible by the computing apparatus 818. Computer-readable media may include, for example, computer storage media such as a memory 822 and communications media. Computer storage media, such as a memory 822, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, compact disc (CD, CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that the storage may be distributed or located remotely and accessed via a network or other communication link (e.g., using a communication interface 823).

The computing apparatus 818 may comprise an input/output controller 824 configured to output information to one or more output devices 825, for example a display or a speaker, which may be separate from or integral to the electronic device. The input/output controller 824 may also be configured to receive and process an input from one or more input devices 826, for example, a keyboard, a microphone, or a touchpad. In one embodiment, the output device 825 may also act as the input device. An example of such a device may be a touch sensitive display. The input/output controller 824 may also output data to devices other than the output device, e.g., a locally connected printing device. In some embodiments, a user may provide input to the input device(s) 826 and/or receive output from the output device(s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

The operations described herein may be performed by a computer or computing device. The computing devices comprise processors and computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, NVMe devices, persistent memory devices, DVDs, CDs, floppy disks, tape cassettes, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples may have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," and "the" are intended to mean that there are one or more of the elements. The terms "comprising," "including," and "having" are intended to be inclusive and mean that there may be additional elements other than the listed elements. The term "exemplary" is intended to mean "an example of"

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:
generating, by a virtual storage area network (VSAN) component of a virtualization platform, primary metadata for a child clone of a VSAN object in a software-defined storage (SDS) data store managed by the VSAN component, the primary metadata for the child clone comprising a logical block address (LBA) for data in a data region of the child clone and a physical sector address (PSA) for data in the data region of the child clone, the primary metadata for the child clone mapping the LBA for data in the data region of the child clone to the PSA for data in the data region of the child clone;
copying, by the VSAN component, at least a portion of primary metadata for a parent clone of the child clone into archival metadata for the child clone, the archival metadata for the child clone comprising an LBA for data in a data region of the parent clone and a clone identifier (ID) identifying the parent clone;
receiving, by the VSAN component, a read request having a read request LBA;
determining, by the VSAN component, whether the read request LBA is within the primary metadata for the child clone;
returning, by the VSAN component and based on at least determining that the read request LBA is within the primary metadata for the child clone, data from the data region of the child clone;
determining, by the VSAN component and based on at least determining that the read request LBA is not within the primary metadata for the child clone, whether the read request LBA is within the archival metadata for the child clone; and
returning, by the VSAN component and based on at least determining that the read request LBA is within the archival metadata for the child clone, data from the data region of the parent clone or a data region of another ancestor of the child clone.

2. The method of claim 1, further comprising:
copying archival metadata for the parent clone into the archival metadata for the child clone, thereby creating a complete reference for a set of ancestors of the child clone, wherein the set of ancestors of the child clone comprises the parent clone of the child clone; and
based on at least determining that the read request LBA is within the archival metadata for the child clone, determining whether the read request LBA is within the data region of the parent clone or within the data region of the other ancestor of the child clone.

3. The method of claim 2, further comprising:
based on at least determining that the read request LBA is not within the primary metadata for the child clone or within the archival metadata for the child clone, returning an indication of the read request LBA not being found in either the child clone or the set of ancestors of the child clone.

4. The method of claim 1, further comprising:
generating a clone table for the child clone, the clone table for the child clone comprising the clone ID identifying the parent clone, a universally unique identifier (UUID) of the parent clone, and a snapshot ID.

5. The method of claim 1, wherein the primary metadata for the child clone further comprises a number of blocks for the LBA for data in a data region of the child clone, and wherein the archival metadata for the child clone further comprises a number of blocks for the LBA for data in a data region of the parent clone.

6. The method of claim 1, wherein the primary metadata for the child clone comprises a B+tree.

7. The method of claim 1, wherein the archival metadata for the child clone is read-only.

8. A computer system comprising:
a processor; and
a non-transitory computer readable medium having stored thereon program code executable by the processor to cause the computer system to perform operations comprising:
generating, by a virtual storage area network (VSAN) component of a virtualization platform, primary metadata for a child clone of a VSAN object in a software-defined storage (SDS) data store managed by the VSAN component, the VSAN component virtualizing storage resources of a plurality of storage nodes into a single global object, the primary metadata for the child clone comprising a logical block address (LBA) for data in a data region of the child clone and a physical sector address (PSA) for data in the data region of the child clone, the primary metadata for the child clone mapping the LBA for data in the data region of the child clone to the PSA for data in the data region of the child clone;
copying, by the VSAN component, at least a portion of primary metadata for a parent clone of the child clone into archival metadata for the child clone, the archival metadata for the child clone comprising an LBA for data in a data region of the parent clone and a clone identifier (ID) identifying the parent clone;
receiving, by the VSAN component, a read request having a read request LBA;
determining, by the VSAN component, whether the read request LBA is within the primary metadata for the child clone;
returning, by the VSAN component and based on at least determining that the read request LBA is within the primary metadata for the child clone, data from the data region of the child clone;

determining, by the VSAN component and based on at least determining that the read request LBA is not within the primary metadata for the child clone, whether the read request LBA is within the archival metadata for the child clone; and returning, by the VSAN component and based on at least determining that the read request LBA is within the archival metadata for the child clone, data from the data region of the parent clone or a data region of another ancestor of the child clone.

9. The computer system of claim 8, the operations further comprising:

copying archival metadata for the parent clone into the archival metadata for the child clone, thereby creating a complete reference for a set of ancestors of the child clone, wherein the set of ancestors of the child clone comprises the parent clone of the child clone; and determining, based on at least determining that the read request LBA is within the archival metadata for the child clone, whether the read request LBA is within the data region of the parent clone or within the data region of the other ancestor of the child clone.

10. The computer system of claim 9, the operations further comprising:

returning, based on at least determining that the read request LBA is not within the primary metadata for the child clone or within the archival metadata for the child clone, an indication of the read request LBA not being found in either the child clone or the set of ancestors of the child clone.

11. The computer system of claim 8, the operations further comprising:

generating a clone table for the child clone, the clone table for the child clone comprising a universally unique identifier (UUID) of the parent clone, and a snapshot ID.

12. The computer system of claim 8, wherein the primary metadata for the child clone further comprises a number of blocks for the LBA for data in a data region of the child clone, and wherein the archival metadata for the child clone further comprises a number of blocks for the LBA for data in a data region of the parent clone.

13. The computer system of claim 8, wherein the primary metadata for the child clone comprises a B+tree.

14. The computer system of claim 8, wherein the archival metadata for the child clone is read-only.

15. A non-transitory computer storage medium having stored thereon program code executable by a processor to perform operations comprising:

generating, by a virtual storage area network (VSAN) component of a virtualization platform, primary metadata for a child clone of a VSAN object in a software-defined storage (SDS) data store managed by the VSAN component, the VSAN component virtualizing storage resources of a plurality of storage nodes into a single global object, the VSAN component virtualizing storage resources of a plurality of storage nodes into a single global object, the primary metadata for the child clone comprising a logical block address (LBA) for data in a data region of the child clone and a physical sector address (PSA) for data in the data region of the child clone, the primary metadata for the child clone mapping the LBA for data in the data region of the child clone to the PSA for data in the data region of the child clone;

copying, by the VSAN component, at least a portion of primary metadata for a parent clone of the child clone into archival metadata for the child clone, the archival metadata for the child clone comprising an LBA for data in a data region of the parent clone and a clone identifier (ID) identifying the parent clone;

receiving, by the VSAN component, a read request having a read request LBA;

determining, by the VSAN component, whether the read request LBA is within the primary metadata for the child clone;

returning, by the VSAN component and based on at least determining that the read request LBA is within the primary metadata for the child clone, data from the data region of the child clone;

determining, by the VSAN component and based on at least determining that the read request LBA is not within the primary metadata for the child clone, whether the read request LBA is within the archival metadata for the child clone; and returning, by the VSAN component and based on at least determining that the read request LBA is within the archival metadata for the child clone, data from the data region of the parent clone or a data region of another ancestor of the child clone.

16. The computer storage medium of claim 15, the operations further comprising:

copying archival metadata for the parent clone into the archival metadata for the child clone, thereby creating a complete reference for a set of ancestors of the child clone, wherein the set of ancestors of the child clone comprises the parent clone of the child clone; and based on at least determining that the read request LBA is within the archival metadata for the child clone, determining whether the read request LBA is within the data region of the parent clone or within the data region of the other ancestor of the child clone.

17. The computer storage medium of claim 16 the operations further comprising:

based on at least determining that the read request LBA is not within the primary metadata for the child clone or within the archival metadata for the child clone, returning an indication of the read request LBA not being found in either the child clone or the set of ancestors of the child clone.

18. The computer storage medium of claim 15, the operations further comprising:

generating a clone table for the child clone, the clone table for the child clone comprising a universally unique identifier (UUID) of the parent clone, and a snapshot ID.

19. The computer storage medium of claim 15, wherein the primary metadata for the child clone further comprises a number of blocks for the LBA for data in a data region of the child clone, and wherein the archival metadata for the child clone further comprises a number of blocks for the LBA for data in a data region of the parent clone.

20. The computer storage medium of claim 15, wherein the primary metadata for the child clone comprises a B+tree.

\* \* \* \* \*